US009523593B2

(12) United States Patent
Kunitachi et al.

(10) Patent No.: US 9,523,593 B2
(45) Date of Patent: Dec. 20, 2016

(54) TFT DISPLAY TRIM LIGHTING STRUCTURE

(71) Applicants: DENSO International America, Inc., Southfield, MI (US); DENSO CORPORATION, Kariya-shi, Aichi-ken (JP)

(72) Inventors: Ryo Kunitachi, Novi, MI (US); Ramesh Mishra, Troy, MI (US)

(73) Assignees: Denso International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 126 days.

(21) Appl. No.: 14/311,867

(22) Filed: Jun. 23, 2014

(65) Prior Publication Data
US 2014/0376204 A1  Dec. 25, 2014

Related U.S. Application Data

(60) Provisional application No. 61/838,416, filed on Jun. 24, 2013.

(51) Int. Cl.
*G01D 11/28* (2006.01)
*G01D 7/04* (2006.01)
(52) U.S. Cl.
CPC .............. *G01D 11/28* (2013.01); *G01D 7/04* (2013.01)
(58) Field of Classification Search
CPC ..... G01D 11/25; G01D 7/04; B60K 2350/203; B60K 2350/2039; B60Q 3/044; B60Q 3/005; B60Q 3/004; B60Q 3/04
See application file for complete search history.

(56) References Cited

U.S. PATENT DOCUMENTS

| 6,318,872 B1* | 11/2001 | Kato .............. G01D 11/28 362/216 |
| 6,379,015 B2* | 4/2002 | Wilhelm ........... G01D 13/28 116/284 |
| 2008/0123322 A1* | 5/2008 | Tane .............. B60K 35/00 362/23.01 |

(Continued)

FOREIGN PATENT DOCUMENTS

JP  2005-156180  6/2005
JP  2006-194829  7/2006

(Continued)

OTHER PUBLICATIONS

Search Report and Written Opinion from corresponding PCT Application No. PCT/US2014/043845 dated Oct. 15, 2014 (17 pages).

*Primary Examiner* — Elmito Breval
*Assistant Examiner* — Matthew Peerce
(74) *Attorney, Agent, or Firm* — Harness, Dickey & Pierce, P.L.C.

(57) ABSTRACT

The present teachings provide for a light guide for a vehicle dashboard display having a first display panel. The light guide can include a guide structure secured to the vehicle dashboard display proximate to the first display panel. The guide structure can be configured to transmit light from the first display panel at a first position, through the guide structure, to a second position spaced apart from the first display panel.

17 Claims, 3 Drawing Sheets

(56) References Cited

U.S. PATENT DOCUMENTS

2013/0114240 A1* 5/2013 Makita .................. G01D 13/28
362/23.19

FOREIGN PATENT DOCUMENTS

| JP | 2010-127832 | 6/2010 |
|----|-------------|--------|
| JP | 2011-123406 | 6/2011 |
| JP | 2012032209 A | 2/2012 |
| JP | 2012-117913 | 6/2012 |

* cited by examiner

TFT DISPLAY TRIM LIGHTING STRUCTURE

CROSS-REFERENCE TO RELATED APPLICATIONS

This application claims the benefit of U.S. Provisional Application No. 61/838,416 filed on Jun. 24, 2013, the entire disclosure of which is incorporated herein by reference.

FIELD

The present disclosure relates to thin film transistor ("TFT") display trim lighting structures for a vehicle instrument panel.

BACKGROUND

This section provides background information related to the present disclosure, which is not necessarily prior art.

Demand has increased for thin film transistor ("TFT") displays used for in-vehicle displays, such as the instrument cluster for displaying vehicle speed, engine speed, and vehicle parameters for example. TFT displays can be advantageous over traditional analogue dials, for example due to their ability to be programmed to display different features. However, some vehicle occupants find the flat, two-dimensional nature of TFT displays to be less aesthetically pleasing than traditional three-dimensional, gages. Such flat TFT displays are therefore subject to improvement.

SUMMARY

This section provides a general summary of the disclosure, and is not a comprehensive disclosure of its full scope or all of its features.

The present teachings provide for a light guide for a vehicle dashboard display having a first display panel. The light guide can include a guide structure configured to be secured to the vehicle dashboard display proximate to the first display panel. The guide structure can be configured to transmit light from the first display panel through the light guide to a surface of the guide structure spaced apart from the first display panel.

The present teachings further provide for a light guide for a vehicle dashboard display having a display panel. The light guide can include a base and a light distribution element. The base can be configured to be secured at the display panel. The base can be configured to direct light emitted by the display panel away from the display panel to the light distribution element when the base is mounted to the display panel.

The present teachings further provide for a vehicle dashboard display including a first electronic display panel and a light guide. The first electronic display panel can have a display face. The light guide can include a base and a light distribution member. The base can be proximate to the display face and disposed about a periphery of the display face. The light distribution member can be coupled to the base and spaced apart from the display face. Light emitted by the first electronic display can pass through the base and the light distribution member to be emitted by the light distribution member at a position spaced apart from the display face.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Vehicles typically include an instrument cluster for displaying information about the vehicle, such as vehicle speed, engine speed, fuel reserves, fuel mileage, vehicle mileage, coolant temperature, oil pressure, various system warnings, operating modes, or information regarding other vehicular or external conditions for example. Instrument clusters are positioned within the vehicle in a location where a vehicle operator can visually inspect the information displayed while operating the vehicle. In an automobile, for example, the instrument cluster is typically disposed in a dashboard proximate to the front of the vehicle and generally between the vehicle front and the operator or driver. While the invention described herein will be generally discussed with regard to an automobile, the invention can be used with other vehicles that incorporate instrument clusters, such as trucks, busses, ATVs, RVs, watercraft, aircraft, agricultural machinery, or military vehicles for example.

Figure 1A:
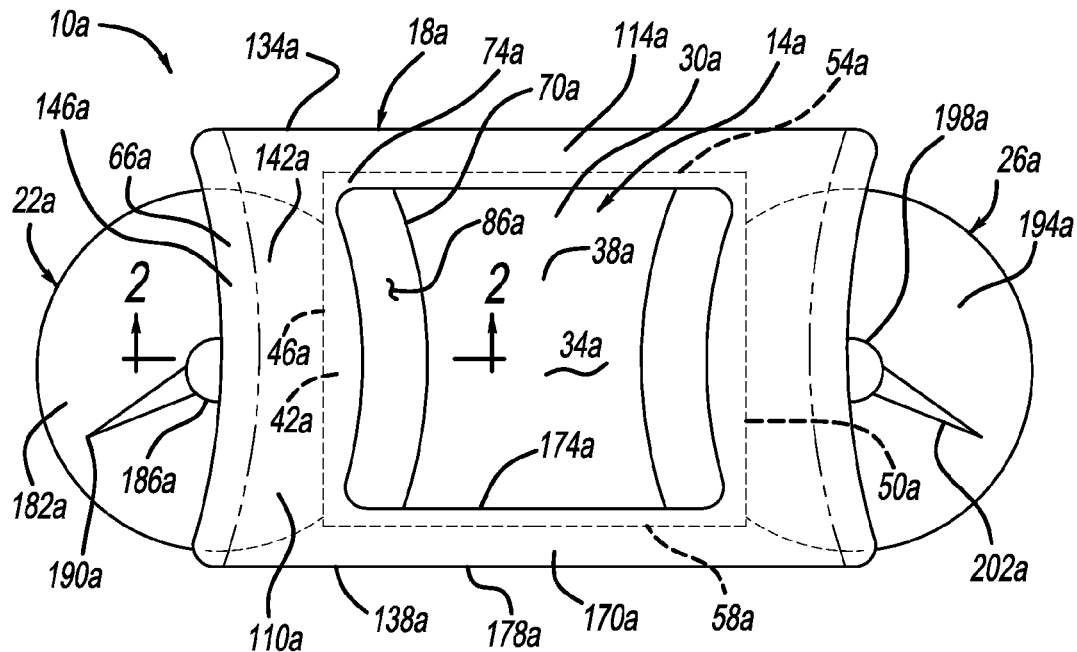
FIG. 1A is a front view of a vehicle instrument cluster having a display and a light guide of a first construction in accordance with the present disclosure.
Figure 1B:
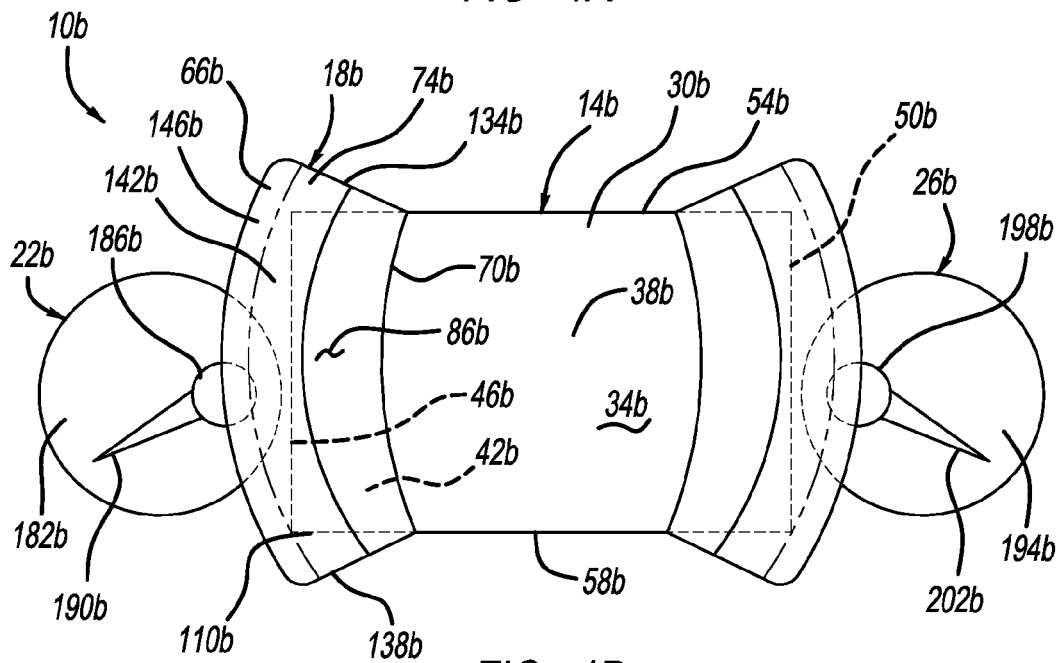
FIG. 1B is a front view of a vehicle instrument cluster having a display and a light guide of a second construction in accordance with the present disclosure.
Figure 1C:
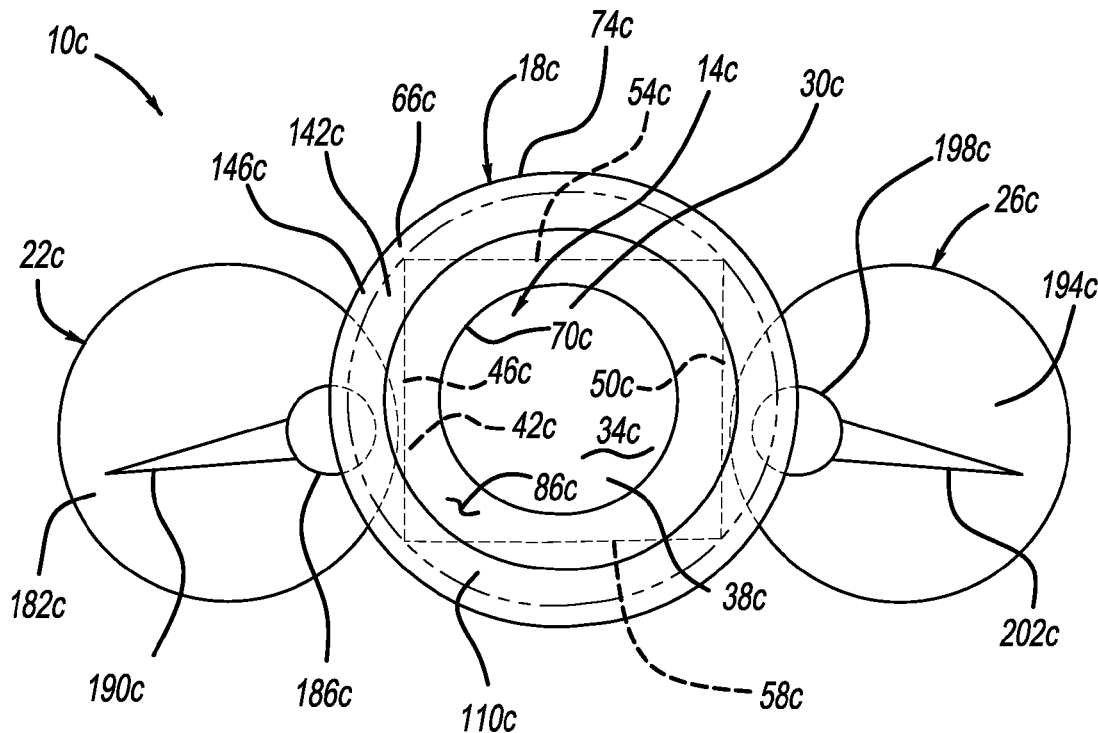
FIG. 1C is a front view of a vehicle instrument cluster having a display and a light guide of a third construction in accordance with the present disclosure.
Figure 2:
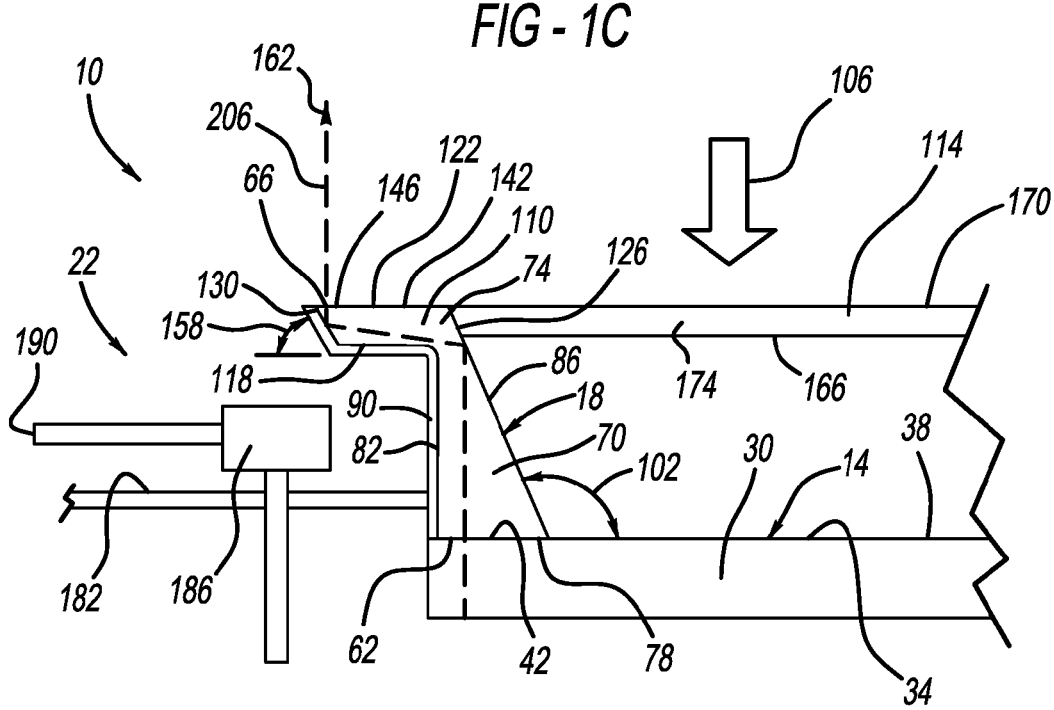
FIG. 2 is a cross-sectional view of the vehicle instrument cluster of FIG. 1 cut along line 2-2.

With reference to FIGS. 1A-1C and FIG. 2, an instrument cluster 10 for a vehicle (not shown) is illustrated. Like reference numbers shown with respective suffixes "a", "b", or "c" refer to similar elements in FIGS. 1A, 1B, and 1C, and are described herein without respective suffixes. While FIG. 2 is shown with respect to the elements of FIG. 1A, it is understood that the elements shown in FIG. 2 can also be found in the constructions shown in FIGS. 1B and 1C. Accordingly, respective suffixes are not shown on FIG. 2.

The instrument cluster 10 can include a first display 14, and a light guide 18. The instrument cluster 10 can additionally include a second display 22 and a third display 26. The first display 14 can be an electronic display that can be programmed to receive electronic signals from the vehicle or vehicle computer (not shown) and display a first set of information. In the examples provided, the first display 14 is a thin film transistor ("TFT") display including a TFT display panel 30, though other electronic displays can be used, such as a liquid crystal display ("LCD") for example. The TFT display panel 30 is generally rectangular in shape and has a generally flat display surface 34 configured to face the operator and display the first set of information to the operator in a central area 38 of the display surface 34. As is known in the art, TFT displays can be programmed to visually display any type of information through the generation of images, animations, video, text, symbols, or light for example. The TFT display panel 30 can be configured to emit light in one or more colors. In the examples provided, the TFT display panel 30 can emit light from a periphery 42 of the display surface 34. The periphery 42 of the display surface 34 can be defined by left and right peripheral sides 46, 50 and top and bottom peripheral sides 54, 58. The left and right peripheral sides 46, 50 can have a curved shape being concave with respect to the central area 38 of the display surface 34 (as shown in FIG. 1A), convex (as shown in FIG. 1B), or can be generally straight (not shown). As shown in FIGS. 1A and 1B, the top and bottom peripheral sides 54, 58 can be generally straight, though other shapes can be used. Alternatively, the periphery 42 of the display surface 34 can be another shape, such as circular (as shown in FIG. 1C), or any other shape for example.

The light guide 18 can be configured to receive light from the TFT display panel 30 at a first location 62, guide the light to a second location 66 spaced apart and offset from the first location 62, and emit the light at the second location 66. The first location 62 can be located at the periphery 42 of the display surface 34 and can be along a portion of the periphery 42 or the entire periphery 42. The second location 66 can be located outside of the periphery 42 of the display surface 34. The second location 66 can extend around a portion of the periphery 42 or the entire periphery 42. The second location 66 can be between the operator and the first display 14 to add a perception of depth or 3-dimensions to the first display 14. In this way, the light can be visible to the operator at the second location 66 but not at the first location 62. The light guide 18 can have a base 70 and a distribution element 74. The base 70 and distribution element 74 can be formed of a generally transparent or translucent material to allow the light to be transmitted through the light guide 18. For example, the base 70 and distribution element 74 can be a thermoplastic material such as poly methyl methacrylate ("PMMA") for example. The base 70 and distribution element 74 can be integrally formed as a single piece.

The base 70 can be coupled to the instrument cluster 10 proximate to the first display 14 and can have a receiving surface 78, an outer surface 82 (FIG. 2), and an inner surface 86. The receiving surface 78 can oppose the display surface 34 of the TFT display panel 30 and can be transparent or translucent to receive light into the base 70 when light is emitted from the display surface 34 at the first location 62. The receiving surface 78 can abut the display surface 34 at the first location 62. The light guide 18 can include more than one base 70 and distribution element 74 located along the periphery 42. While shown along the left and right peripheral sides 46, 50 in FIGS. 1A, 1B and 2, the base 70 can additionally, or alternatively, extend along top and bottom peripheral sides 54, 58. While shown along the entire periphery 42 in FIG. 1C, the base 70 can alternatively extend only along a portion or portions of the periphery 42.

The inner surface 86 can extend from the receiving surface 78 to the distribution element 74 along an inner side of the base 70 proximate to the central area 38 of the display surface 34. The outer surface 82 can extend from the receiving surface 78 to the distribution element 74 along an outer side of the base 70 distal to the central area 38 and proximate to the periphery 42 of the display surface 34. The inner surface 86 and outer surface 82 can be configured to limit light from being emitted through the outer surface 82 or the inner surface 86. In the examples provided, the outer surface 82 extends perpendicular to the display surface 34 and the receiving surface 78, though other angles can be used. The outer surface 82 can have a layer 90 of opaque paint or coating to prevent light from escaping the base 70 through the outer surface 82, though other coatings can be used, such as mirror or semi-mirror films for example. In the examples provided, the inner surface extends at an angle 102 relative to the display surface 34 and the receiving surface 78 such that the light received through the receiving surface 78 is reflected back into the base 70 and toward the distribution element 74 instead of being emitted through the inner surface 86. In this way, the base 70 has a generally wedge shape being wider proximate to the display surface 34. Alternatively, the inner surface 86 can include a layer (not shown) of opaque paint or coating to prevent light from escaping the base 70 through the inner surface 86, though other coatings or films can be used, such as mirror or semi-mirror films for example. Alternatively, the angle 102 can be configured to emit some of the light while reflecting some of the light toward the distribution element 74. The angle 102 of inner surface 86 can be configured to prevent the operator from seeing the periphery 42 of the display surface 34 when viewed head on as indicated by direction 106, when the inner surface 86 is transparent. The base 70 can support the distribution element 74 which can be spaced apart from the display surface 34, with the base 70 being between the distribution element 74 and the display surface 34.

The distribution element 74 can have a main body 110 coupled to the base 70 and configured to receive light transmitted from the base 70. While shown only along the left and right peripheral sides 46, 50 in FIGS. 1A, 1B, and 2, the main body 110 can additionally, or alternatively, extend along the top and bottom peripheral sides 54, 58 when the base 70 extends along the top and bottom peripheral sides 54, 58. While shown along the entire periphery 42 in FIG. 1C, the main body 110 can alternatively extend only along a portion or portions of the periphery 42 when the base 70 only extends along a portion of the periphery 42. As shown in FIGS. 1A and 2, the distribution element 74 can include a bridge member 114 extending from the main body 110 to extend the distribution element 74 along more of the periphery 42 than the base 70. The bridge member 114 can connect spaced apart main bodies 110, thus connecting spaced apart bases 70. The bridge member 114 and main body 110 can be a single, unitarily formed piece.

The main body 110 can have a bottom surface 118, a top surface 122, an inner surface 126, and an outer surface 130 that extend between a first end 134 and a second end 138. The bottom surface 118 and the top surface 122 can be spaced apart and generally parallel to the display surface 34, though other angles can be used. The bottom surface 118 can extend from the outer surface 82 of the base 70 outward and away from the central area 38 of the display surface 34. The top surface 122 can have a first area 142 proximate to the central area 38 of the display surface 34 and a second area 146 distal to the central area 38. The inner surface 126 of the main body 110 can extend from the inner surface 86 of the base 70 to the top surface 122 proximate to the first area 142. The outer surface 130 of the main body 110 can extend from the bottom surface 118 to the top surface 122 of the main body 110 proximate to the second area 146.

The inner surface 126, outer surface 130, and the bottom surface 118 can be configured to limit light from being emitted therefrom. In the examples provided, the inner surface 126 is transparent and extends at the angle 102 relative to the display surface 34 such that the light received from the base 70 is reflected back into the distribution element 74 instead of being emitted through the inner surface 126, though other angles relative to the inner surface 86 of the base 70 can be used. The inner surface 126 can alternatively have a layer (not shown) of opaque paint or coating to prevent light from escaping through the inner surface 126, though other coatings or films can be used, such as mirror or semi-mirror films for example. Alternatively, the angle 102 can be configured to allow some of the light to be emitted from the inner surface while reflecting some of the light back through the main body 110. In the examples provided, the layer (not shown) can extend along the bottom surface 118 and outer surface 130 to prevent light from escaping the main body 110 through the bottom surface 118 or outer surface 130, though other coatings or films can be used, such as mirror or semi-mirror films for example. The outer surface 130 can be formed at an angle 158 configured to reflect the light transmitted through the main body 110 toward the second area 146 of the top surface 122.

The second area 146 of the top surface 122 can coincide with the second location 66. The second area 146 can be transparent or translucent to permit the light transmitted through the main body 110 to be emitted from the second area 146 at the second location 66. In the examples provided, the second area 146 is transparent to allow the light to be emitted in direction 162, away from the display surface 34 and toward the operator. In the examples provided, the first area 142 of the top surface 122 is transparent and some light can be emitted from the first area 142 of the top surface 122. Due to the angles at which the light is reflected within the base 70 and distribution element 74, more light can be emitted from the second area 146 than the first area 142, i.e. the light emitted from the main body 110 can be more intense from the second area 146 and at the second location 66 than from the first area 142. Alternatively, the first area 142 can have a layer (not shown) of opaque paint or coating to prevent light from escaping the main body 110 through the first area 142, though other coatings or films can be used, such as mirror or semi-mirror films for example.

With specific reference to FIGS. 1A, 1B, and 2, the bridge members 114 can extend from the main body 110 and can be configured to receive light from the main body 110. In the examples provided, the bridge members 114 extend from the main body 110 across the top and bottom peripheral sides 54, 58 and connect with another main body 110 located on the opposite one of the left and right peripheral sides 46, 50. The bridge members 114 can be spaced apart from and can overlap with the top and bottom peripheral sides 54, 58 of the display surface 34 to hide the top and bottom peripheral sides 54, 58 from view of the operator when viewed head on from direction 106. The bridge members 114 can be a transparent material to allow the light to be transmitted through and emitted from the bridge members 114, to create an ambient lighting effect along the top and bottom peripheral sides 54, 58. The bridge members 114 can have a bottom bridge surface 166, a top bridge surface 170, an inner bridge surface 174 and an outer bridge surface 178. Each of the bridge surfaces 166, 170, 174, 178 can be configured to be transparent or translucent to permit light to be emitted from the respective surface 166, 170, 174, 178 or can have a layer (not shown) of opaque paint or coating to prevent light from escaping the bridge member 114 through the respective surface 166, 170, 174, 178 though other coatings or films can be used, such as mirror or semi-mirror films for example.

The second display 22 can be spaced apart from the first display 14 and configured to display a second set of information. The second set of information can be different than the first set of information. As shown in FIGS. 1A-1C and FIG. 2, the second display 22 can be a dial gage including a dial face 182, a pivot 186, and a gage needle 190. Alternatively, the second display 22 can be a digital display (see FIG. 3), such as a TFT display or LCD for example. The second set of information can be displayed on the dial face 182 and the gage needle 190 can be coupled to the pivot 186 for rotation therewith. The pivot 186 can be configured to rotate the gage needle 190 to point to different elements or indicators (not shown) of the second set of information. For example, the second set of information can include lines or marks (not shown) to indicate fuel reserves or engine temperature, with the location of the gage needle 190 indicating the level of fuel reserves or engine temperature for example. As shown in FIGS. 1A, 1B, and 2, the second display 22 is adjacent to the first display 14 relative to the left peripheral side 46. The distribution element 74 can overlap with the second display 22 to hide a portion of the second display 22 from view of the operator when viewed head on from direction 106. In the examples provided, the bottom surface 118 of the main body 110 of the distribution element 74 extends from the base 70 to overlap part of the second display 22. By overlapping the second display 22, the second location 66 can be above part of the second display 22, such that the distribution element 74 can emit light from the second location 66 between the operator and the second display 22 to create a visual effect of providing depth or 3-dimensions to the first display 14.

The third display 26 can be spaced apart from the first display 14 and configured to display a third set of information. The third set of information can be different than the first and second sets of information. As shown in FIGS. 1A-1C and FIG. 2, the third display 26 can be a dial gage including a dial face 194, a pivot 198, and a gage needle 202. Alternatively, the third display 26 can be a digital display, such as a TFT display or LCD for example. The third set of information can be displayed on the dial face 194 and the gage needle 202 can be coupled to the pivot 198 for rotation therewith. The pivot 198 can be configured to rotate the gage needle 202 to point to different elements or indicators (not shown) of the third set of information. For example, the third set of information can include lines or marks (not shown) to indicate fuel reserves or engine temperature, with the location of the gage needle 202 indicating the level of fuel reserves or engine temperature for example. As shown in FIGS. 1A, 1B, and 2, the third display 26 is adjacent to the first display 14 relative to the right peripheral side 50. The distribution element 74 can overlap with the third display 26 to hide a portion of the third display 26 from view of the operator when viewed head on from direction 106. In the examples provided, the bottom surface 118 of the main body 110 of the distribution element 74 extends from the base 70 to overlap part of the third display 26. By overlapping the third display 26, the second location 66 can be above part of the third display 26, such that the distribution element 74 can emit light from the second location 66 between the operator and the third display 26 to create a visual effect of providing depth or three dimensions to the first display 14.

With specific reference to FIG. 2, the light can generally travel along path 206 from the first location 62 through the light guide 18, to the second location 66. The light from the periphery 42 of the display surface 34 can be received by the base 70 through the receiving surface 78. The light can travel generally perpendicular to and outward from the display surface 34 until reflected by the inner surfaces 86, 126. The inner surfaces 86, 126 can reflect the light to travel generally parallel to the display surface 34 and outward relative to the periphery 42 until reflected by the outer surface 130. The outer surface 130 can reflect the light to travel generally outward from the display surface 34 toward the operator at the second location 66. In this way, the path 206 can bend around the second or third displays 22, 26. It is understood that the light can be reflected and/or refracted to take other paths within the light guide 18 and that path 206 is meant to illustrate a general, exemplary path between the first location 62 and the second location 66 and not intended to represent the only path or all possible paths of light within the light guide 18.

The TFT display panel 30 can be configured such that the light emitted from the periphery and transmitted through the light guide 18 corresponds different conditions of the vehicle or external to the vehicle. The light can change colors, such as red or yellow for example, flash, or turn on/off, to indicate a warning, such as a vehicle system error or road condition for example. The TFT display panel 30 can also be configured to change the light color depending on the mode of the vehicle, such as a fuel efficient mode or a sport mode for example, or the color preference of the operator.

Figure 3:
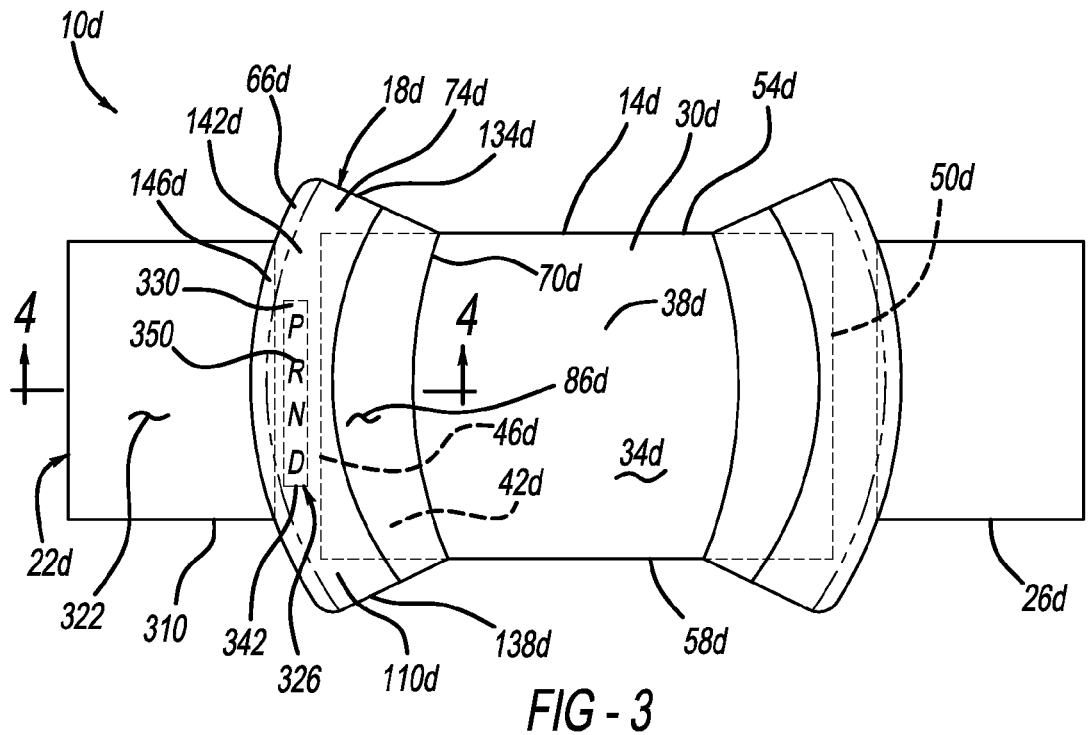
FIG. 3 is a front view of a vehicle instrument cluster having a display and a light guide of a fourth construction in accordance with the present disclosure.
Figure 4:
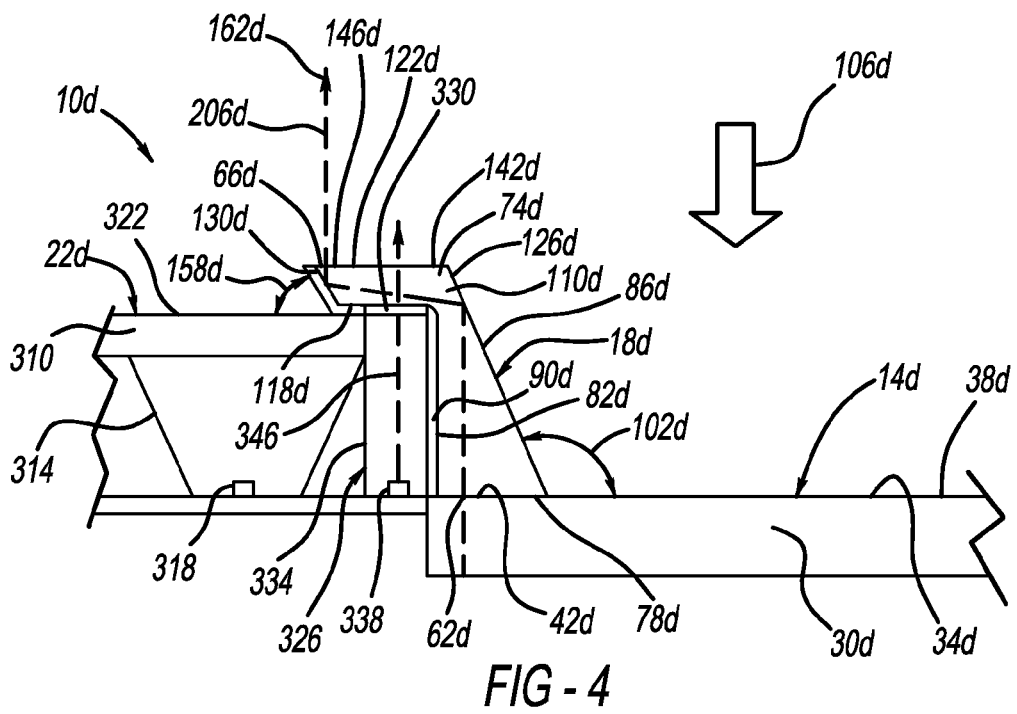
FIG. 4 is a cross-sectional view of a vehicle instrument cluster of a second construction in accordance with the present disclosure.

With reference to FIGS. 3 and 4, an instrument cluster 10*d* having a fourth construction is shown. The instrument cluster 10*d* is similar to instrument cluster 10, with like elements indicated by like numbers with a suffix "a", "b", "c", or "d", and only differences will be discussed. While the instrument cluster 10*d* is shown similar to the construction shown in FIG. 1B, the instrument cluster 10*d* can be constructed in other ways discussed with reference to instrument cluster 10, such as FIG. 1A or 1C for example. In the example provided, the second display 22*d* is an LCD display and can include an LCD display panel 310, a case 314, and a backlight 318. The LCD display panel 310 can have a generally flat LCD display surface 322. Similar to the distribution element 74 and the dial face 182, the distribution element 74*d* can overlap the LCD display panel 310 of the second display 22*d*. The case 314 can be configured to direct light from the backlight 318 through the LCD display panel 310 to illuminate the LCD display surface 322. While the backlight 318 is shown as a single element, as is known in the art, the backlight 318 can include a plurality of light emitting elements.

The instrument cluster 10*d* can include a fourth display 326. The fourth display 326 can be located between the TFT display panel 30*d* and the outer surface 130*d* of the main body 110*d*. In the example provided, the fourth display 326 includes a dial plate 330, a light channel 334, and a light source 338. The main body 110*d* can define a third area 342 disposed within the first area 142*d* between the second area 146*d* and the inner surface 126*d* of the main body 110*d*. In the example provided, the third area 342 does not extend the entire length of the main body 110*d* from end 134*d* to end 138*d*. Light from the first display 14*d* traveling within the main body 110*d* can be transmitted through or reflected around the third area 342 to be emitted from the second area 146*d* at the second location 66*d*. The third area 342 is in line with the light channel 334, which is inward of the main body 110*d* and extends between the third area 342 and the light source 338.

The dial plate 330 is disposed in line with the third area 342 and light channel 334. The light channel 334 can be configured to direct light from the light source 338 outward relative to the display surface 34*d* and generally in the direction 162*d*. The light from the light source 338 travels generally along path 346, through the light channel 334, third area 342, and dial plate 330, to illuminate the dial plate 330 to be visible by the operator. The dial plate 330 defines an indicator 350 that can indicate a mode of the vehicle when light from the light source 338 to is emitted through the indicator 350. In the example provided, the indicator 350 include the letters "P R N D" and light is permitted to be emitted from the one of the letters that corresponds to a mode of the vehicle's transmission (not shown). While not specifically shown, the fourth display 326 can include separate light sources 338 and light channels 334 corresponding to each of the letters or indicators 350. Each of the light channels 334 can guide light from one of the light sources 338 to a respective one of the letters or indicators 350, while preventing light from another one of the light sources 338 from illuminating the respective indicator 350. In this way, the respective light source can be turned on to illuminate a respective one of the indicators 350. Each of the separate light sources 338 can also emit light of a different color.

The indicators 350 can alternatively provide other information related to the vehicle. The indicators 350 can be printed on the dial plate 330. The indicators 350 can also be formed on the dial plate in any suitable manner, such as by being etched or cut out of the dial plate 330. The dial plate 330 can be separate from the main body 110*d* and can be disposed between the bottom surface 118*d* of the main body 110*d* and the light channel 334. The light source 338 can be configured to emit light of a different color or type than the light emitted at the second location 66*d*.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A light guide for a vehicle dashboard display having a first display panel, said light guide comprising:
    a guide structure configured to be secured to the vehicle dashboard display proximate to the first display panel and configured to transmit light from the first display panel through said light guide to a surface of said guide structure spaced apart from the first display panel;
    the guide structure includes a base and a light distribution element, the base extends away from the first display panel to the light distribution element, the light distribution element extends from the base in a direction outward and away from the first display panel, a first location of the base is at the first display panel and receives light from the first display panel into the guide structure; and
    an inner surface of the base of the guide structure extends away from the first display panel to the light distribution element at an angle configured to reflect light that has entered the base at the first location, the inner surface is configured to prevent light from escaping out of the base through the inner surface so that the light can be visible to the operator at the light distribution element, but not through the inner surface;
    wherein the guide structure is disposed about a periphery of the first display panel such that the inner surface provides a frame of the first display panel; and
    wherein the light distribution element extends outward from the base to a second location that is outside of an outer periphery of the first display panel.

2. The light guide of claim 1, wherein said first display panel is a TFT display.

3. The light guide of claim 1, wherein the vehicle dashboard display has a second display panel separate from the first display panel, and said guide structure partially overlaps the second display panel.

4. The light guide of claim 3, wherein the second display is one of an LCD, a TFT, or a dial.

5. The light guide of claim 1, wherein the guide structure is formed of a transparent or translucent material.

6. The light guide of claim 5, wherein the guide structure includes the inner wall proximate to an interior of the first display panel and an outer wall proximate to a periphery of the first display panel, said outer wall being opaque and said inner wall being angled relative to the first display panel to cover the periphery of the first display panel.

7. The light guide of claim 1, wherein the vehicle dashboard display has a light source spaced apart from the first display panel, and said guide structure is configured to transmit light from the light source to a first area that is spaced apart from the first display panel and is between the first display panel and a second area to which said guide structure directs light from the first display panel.

8. The light guide of claim 7, wherein said guide structure includes at least one indicator for indicating a mode of the vehicle and said guide structure is configured to direct said light from the second light source to illuminate said indicator.

9. A light guide for a vehicle dashboard display having a display panel, said light guide comprising:
    a base and a light distribution element, said base configured to be secured at the display panel and configured to direct light emitted by the display panel away from the display panel to said light distribution element when said base is mounted to the display panel;
    the base extends away from the display panel to the light distribution element, the light distribution element extends from the base in a direction outward and away from the display panel, a first location of the base is at the display panel and receives light from the display panel into the guide structure; and
    an inner surface of the base extends away from the display panel to the light distribution element at an angle configured to reflect light that has entered the base at the first location, the inner surface is configured to prevent light from escaping out of the base through the inner surface so that the light can be visible to the operator at the light distribution element, but not through the inner surface;

wherein the light guide is disposed about a periphery of the display panel such that the inner surface provides a frame of the display panel; and wherein the light distribution element extends outward from the base to a second location that is outside of an outer periphery of the display panel.

10. The light guide of claim 9, wherein said base and said light distribution element are formed of a transparent or translucent material and said light travels within said material to be directed from the display panel through said base and said light distribution element to a location spaced apart from said display panel.

11. The light guide of claim 10, wherein said light distribution element is integrally formed with said base.

12. The light guide of claim 9, wherein said base overlaps a portion of a perimeter of the display panel when said base is secured at the display panel.

13. The light guide of claim 9, wherein said light distribution element overlaps the display panel and a portion of a secondary display panel of the vehicle dashboard display when said light guide is mounted to the vehicle dashboard display.

14. The light guide of claim 9, wherein the light distribution element includes at least one indicator for indicating a mode of the vehicle and is configured to be illuminated by a light source of the vehicle dashboard display.

15. A vehicle dashboard display comprising:
a first electronic display panel having a display face; and
a light guide including:
  a base proximate to said display face and disposed about a periphery of said display face; and
  a light distribution member coupled to said base and spaced apart from said display face;
the base extends away from the display panel to the light distribution member, the light distribution member extends from the base in a direction outward and away from the display panel, a first location of the base is at the display panel and receives light from the display panel into the guide structure; and
an inner surface of the base of the guide structure extends away from the display panel to the light distribution member at an angle configured to reflect light that has entered the base at the first location, the inner surface is configured to prevent light from escaping out of the base through the inner surface so that the light can be visible to the operator at the light distribution member, but not through the inner surface;
wherein the guide structure is disposed about a periphery of the display panel such that the inner surface provides a frame of the display panel; and
wherein the light distribution member extends outward from the base to a second location that is outside of an outer periphery of the display panel.

16. The vehicle dashboard display of claim 15, further comprising a second display spaced apart from said first electronic display, wherein said light distribution member overlaps a portion of said second display.

17. The vehicle dashboard display of claim 15, further comprising at least one indicator disposed within said light distribution member and a secondary light source spaced apart from said display face, wherein said light source is configured to illuminate said indicator.

* * * * *